J. S. SEYMOUR.
PROCESS AND APPARATUS FOR MAKING CALCIUM CARBID.
APPLICATION FILED OCT. 4, 1905. RENEWED AUG. 8, 1908.
916,495.
Patented Mar. 30, 1909.
2 SHEETS—SHEET 2.
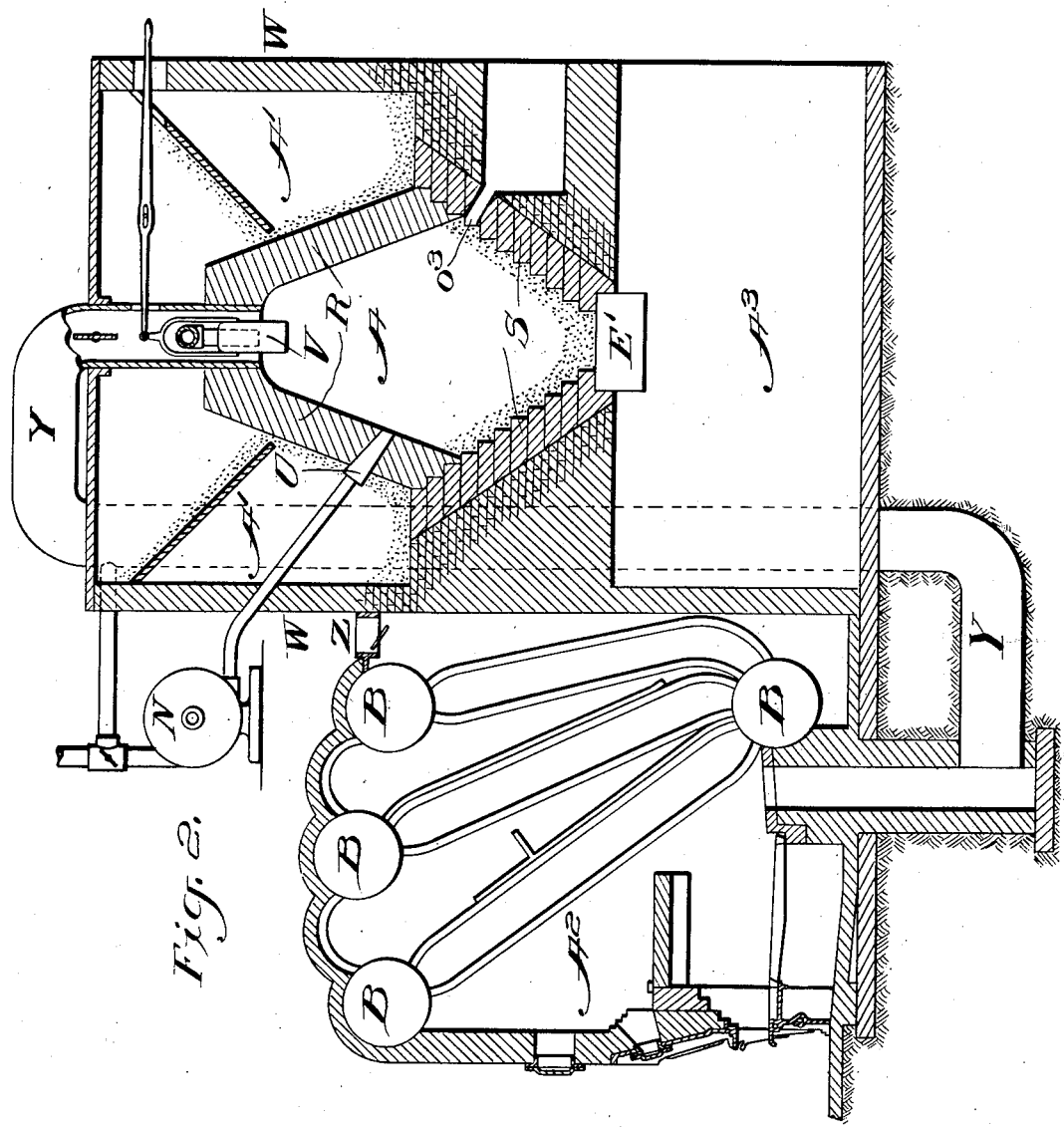
WITNESSES:
INVENTOR
BY his ATTORNEYS

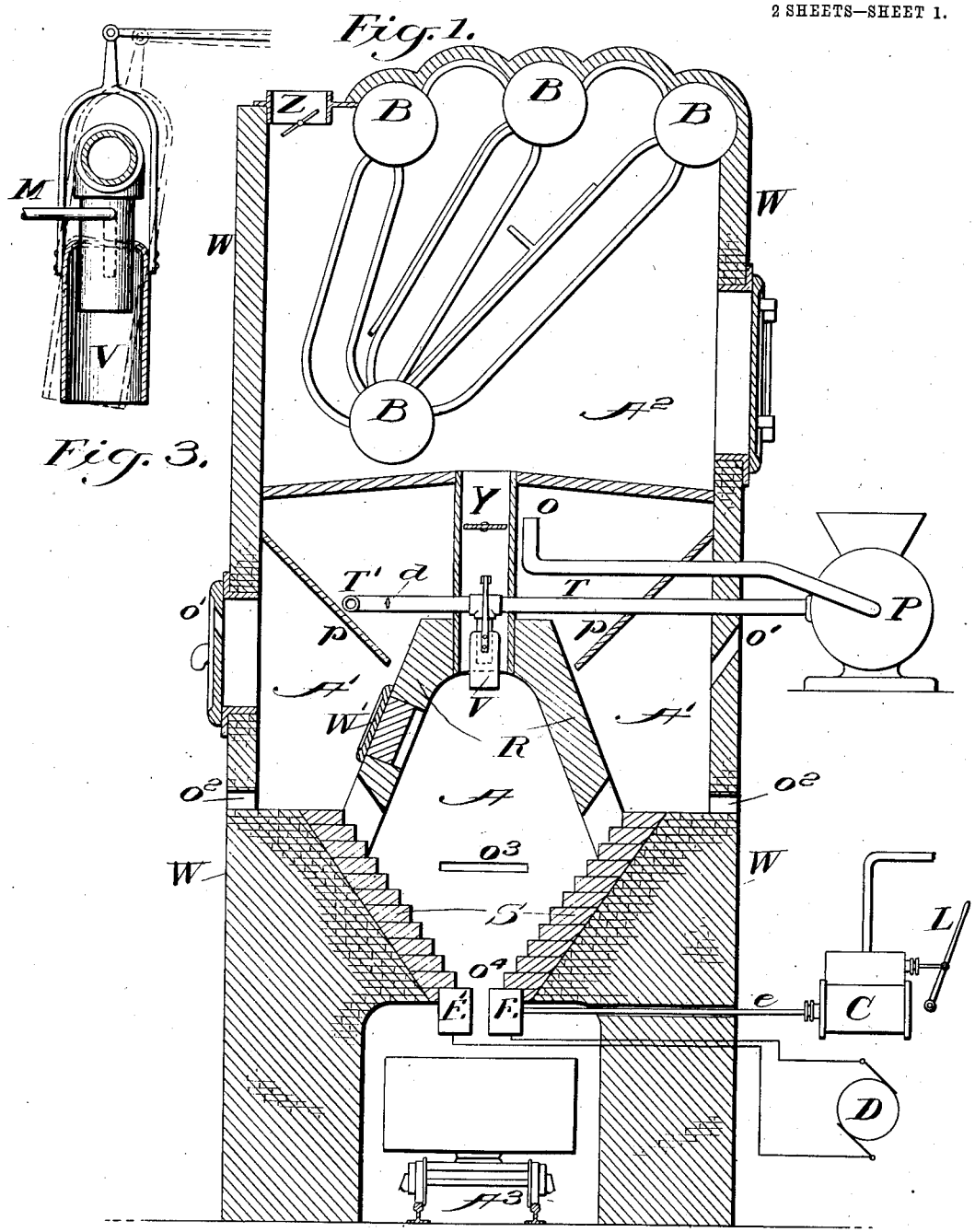

UNITED STATES PATENT OFFICE.

JOHN S. SEYMOUR, OF WHITNEY POINT, NEW YORK.

PROCESS AND APPARATUS FOR MAKING CALCIUM CARBID.

No. 916,495.      Specification of Letters Patent.      Patented March 30, 1909.

Application filed October 4, 1905, Serial No. 281,218. Renewed August 8, 1908. Serial No. 447,591.

*To all whom it may concern:*

Be it known that I, JOHN S. SEYMOUR, a citizen of the United States, and a resident of Whitney Point, in the county of Broome and State of New York, have invented a certain new and useful process and apparatus for making calcium carbid and for smelting and other igneous operations and for the making of igneous compounds where some of the constituents are brought to a state of fusion by intense heat, of which the following is the specification.

My invention relates to improvements in the aforesaid igneous process and in the furnace in which it may be carried out, in which the material to be reduced, fused or combined, and the fuel are injected into the furnace, and also a regulated quantity of air or of a supporter of combustion, all the solid constituents being in a finely divided and preferably in a pulverulent state, and in which the bottom and sloping sides of the combustion chamber are covered and protected by the materials to be reduced, fused or combined, or of one of them, also in a finely divided or pulverulent state; or this protective covering may be finely divided refractory material, which does not take part in the chemical reaction, unless incidentally, its primary action being to insulate and protect that part of the furnace and in which the heat for fusion resulting from the chemical union of the fuel with the air or other supporter of combustion is brought to bear at shortest range on the pulverulent particles to be reduced or fused and with those to be united therewith, while in transit from their introduction to the combustion chamber to the bottom of the chamber, at or near which point is the region of most intense heat and where the heat is greatly increased by blow-pipe action, and from there back, so far as the unconsumed and refractory particles are concerned, to the top of the chamber where the products of combustion pass out.

The objects of my invention are:—First, to obtain perfect combustion of that part of the fuel intended to be burned by adjusting the relative amounts of such fuel and of the supporter of combustion; second, to avoid loss of heat and reduction of furnace temperature by failure to bring each particle of oxygen into intimate contact with the fuel; third, to avoid losses of heat due to varying resistance from ash and clinker, and excess or deficiency in the supporter of combustion; fourth, to avoid loss of heat by radiation and conduction; fifth, to use radiant heat at the shortest distance; sixth, to produce a region of most intense heat and most energetic chemical action into which the particles to be acted on are brought after preheating, by adjusting the dimensions of the furnace, the volume and swiftness of the supporter of combustion and the fineness of the fuel to the time required for most energetic combustion, and also by the aid of blow-pipe action; seventh, to protect the walls of the combustion chamber from the intense heat; eighth, to preheat the incoming material with the outgoing hot gases and burning material; ninth, to economize the process of generating and using heat; tenth, to reduce the nitrogen vehicle to a minimum; eleventh, to provide a tap hole which will not clog by constructing its sides of electrodes which may be heated by an electric current.

Other objects will appear from the hereinafter description, taken in connection with the accompanying drawings, which form part of this specification.

Until my invention was perfected, calcium carbid and other igneous compounds made from highly refractory material were produced on a commercial scale only in the electric furnace, in which the manifest advantages are offset and neutralized by inherent defects, among which are the constant loss by volatilization of the material treated, the waste resulting from the production of a large amount of carbon monoxid which passes off unburned, the fact that portions of the charge fall out of the furnace along with the discharged carbid blocks, the fact that the carbid discharged from the furnace is liable to become partially burned, the fact that the heat within the field of the arc is sufficient not only for smelting but is higher than the temperature necessary to make the carbid, while a few inches from the arc it is not high enough either for smelting or to produce a pure product, though it is sufficient to cause combustion of the carbon and to volatilize the lime, and finally the rapid clogging of the outlet, requiring a far higher temperature to get the carbid to run than that necessary to make the carbid. In the electric furnace, the waste of heat resulting from using temperatures higher than necessary is paralleled by a waste of material, roughly stated when it is said that only one ton of carbid is obtained from two tons of lime and coke, acted on by one electric horsepower for a year.

I will describe the mode of practicing my invention in the manufacture of calcium carbid on a commercial scale, from the description of which it will be obvious that many other carbids and other igneous compounds having high fusing points may readily be made, and various ores reduced and the metal recovered, by varying the material supplied to the furnace and making such minor adaptations as are within the range of the skill of persons working in the art to which it appertains.

In my process I may employ finely divided or pulverulent fuel as soft coal, or liquid fuel in a spray, and the material to be treated may likewise be injected into the combustion chamber in a finely divided or pulverulent form, with the fuel, and this pulverulent fuel or spray of liquid fuel and the material to be treated may be borne into the furnace on, for example, a current of air sufficient in volume to effect complete combustion without the formation of carbon monoxid or of smoke, and without leaving a residue of oxygen in the flue gases; or these constituent materials, the fuel and the supporter of combustion, may be injected separately and afterward commingled in the combustion chamber.

For the combustible I preferably employ high grade soft coal with the smallest percentage of ash, with which the proportion of air to coal is 12 to 1 by weight for complete combustion, although more air may be admitted. The proportion of air, however, may be determined by inspection through a peek-hole in the furnace or by analysis of the flue gases; for perfect combustion is manifested by the absence of smoke, and may be determined by first admitting too little air for complete combustion, the fuel feed being constant, kindling the fuel with a torch, and then gradually increasing the air until the combustion is constant, without smoke. The current of pulverulent fuel or spray fuel when borne on air and admitted at the top of the furnace and directed downward will establish a region of fiercest combustion and most energetic chemical action about 7 feet downward from the inlet, and I therefore construct my combustion chamber preferably from 8 to 12 feet high and larger where the heat is fiercest.

I supply the furnace with the constituents of calcium carbid in the proportion of pulverulent coke 35 parts, pulverulent lime 65 parts, a slightly higher proportion of lime than theory requires, covering the bottom and sloping sides of the furnace to about 4 inches in depth with this material thoroughly mixed, and that the material may not slide too freely into the bottom of the furnace and may protect the sides as high up as possible, I make the sloping sides stepped or roughened and relatively steep. When the combustion chamber has become intensely heated, I enter upon the second stage of my process and inject on the current of air bearing the pulverulent or spray fuel, pulverulent coke and lime in the above mentioned proportions of 35 and 65, when the combustion of the fuel, which is more readily ignited than pulverulent coke, fuses the intermingled pulverulent lime, since at these high temperatures the lime will melt in contact with the carbon and will flow like water, in contact with which the pulverulent carbon at these high temperatures, though it will neither volatilize nor fuse, will unite chemically with the lime and thereby form calcium carbid.

When sufficient calcium carbid has been made for a single run, I draw off the lighter slags through a slag hole at the height of the upper surface of the carbid, toward which a small blast of air or air and pulverulent material is directed. To draw off the charge of carbid I open a tap hole in the bottom of the furnace the sides of which are made of carbon electrodes, between which by the use of a current of electricity I form an electric arc which keeps the tap hole open whenever desired, according to the well-known fact that the temperature needed to get the carbid to run in a satisfactory way without rapid clogging of the outlet is far higher than the temperature necessary to make the carbid. Then I close the tap hole, cover the sloping bottom with pulverulent material, and continue the injection of fuel, air and the constituent materials. My process is thus a continuous one and I may receive the outgoing liquid carbid in a car in which an ingot is formed, or I may receive it in a relatively deep pit into which the carbid drops in globules, cooling sufficiently as they fall, to prevent solidifying in one solid mass at the bottom.

The furnace in which my process may be carried out may be made upright, circular in plan, and containing four chambers one above another, or the uppermost may be set off, or disposed elsewhere, as shown in the accompanying drawings, in which the same characters refer to the same parts.

Figure 1 is a vertical section of my furnace. Fig. 2 is a vertical section of my furnace taken at right angles to that of Fig. 1 but showing the boiler chamber set off at one side instead of as in Fig. 1, on top of the combustion chamber, and showing the chimney flue Y bent and carried down from the top of the combustion chamber to the bottom of the boiler chamber and then upward into the boiler chamber. Fig. 3 is the sleeve on a larger scale.

A is the principal or combustion chamber, the arched top R of which, whether in segments, or built up from blocks, may be renewable, and may be made of highly refractory material in carefully fitted blocks, preferably, in a calcium carbid furnace of blocks of commingled coke, lime and tar formed under heavy pressure, supported on the inclined bottom S by abutments with intervening clear spaces through which the pulverulent material may pass or be fed to cover the bottom of the furnace.

Fig. 2 exhibits the relation of the slag hole $O^3$ to the supplementary twyers U and the pipe connections of the fan N, by which the surface slags may be removed, either by a blast of sprayed oil and air, which burns before it strikes the surface of the liquid carbid, or by a blast containing also pulverulent material as it comes from the pulverizer, or by a hot blast of the products of combustion taken from the chamber A; in any case, I avoid chilling the compound. This Fig. 2 also shows the chamber $A^2$ set off from the perpendicular so that chamber A' may have a movable top giving access to both chambers A' and A for repairs and renewals. A door W' of fire-brick inside Fig. 1, gives access to the combustion chamber A for charging material in lumps or in bulk, in cupola work.

The sleeve V is made of refractory material molded. Its upper edge is provided with a collar which fits the outside of the tube T and is provided with an extension with a hole in the top through which one end of a lever pivoted therein operates to raise and lower the sleeve according to the nature and fineness of the fuel and the strength of the blast; and by a combined lateral and forward and back motion directs the sleeve toward any part of the sloping bottom of the furnace, and the material thereon.

Y is the chimney flue within which at the top of the furnace is the down-turned end of the tube T provided with the sleeve V, through which is injected pulverulent material from the combined pulverizer and fan P ordinarily borne on a current of air of minimum volume for perfect combustion which may be regulated at the air inlets thereof. Any pulverizer capable of air regulation in coöperation with a fan may be employed, but I prefer a cylindrical pulverizer with beaters and fan on the same shaft.

T' is a continuation of the tube T which may be curved so as to deliver pulverulent material tangentially for charging the second chamber A', the output of which is controlled by the damper $d$.

O is a return tube leading from the top of the second chamber A' back to the pulverizer P carrying heated air to the pulverizer, which may be a supporter of combustion and also a vehicle for the pulverulent material.

O' is an inlet into the second chamber A' for the intake of air when T' is closed by the damper $d$.

Baffle plates $p$ mix thoroughly the pulverulent material which may have become somewhat separated by the slow circular motion of the air in this chamber when pulverulent material is delivered to it through the tube T'.

$A^2$ is the uppermost chamber into which the chimney flue Y from the combustion chamber opens and from which the flue Z to the outer air passes. It is provided with a water tube boiler B or may be provided with other economizers to utilize the heat of the flue gases.

The sloping bottom S of the furnace is stepped or roughened in order to detain the pulverulent material from sliding down and to permit the sloping bottom to be made steep in order to serve as the sides of the furnace as high up as possible and at the same time be protected by the pulverulent material from the intense heat, and these sloping sides may be made of highly refractory material but preferably may be made of blocks of pulverulent coke, lime and tar, like the arched top R. A slag hole $O^3$ located at the top of the complete run of liquid carbid is used for drawing off the light slags. A supplementary air blast from the fan N is directed by suitable twyers U at an incline to the surface of the liquid carbid toward the slag hole $O^3$, and the slag hole when not in use is stopped by plastic refractory material as by the common practice of furnace men.

E is an electrode made of a block of retort carbon which has been reduced to powder and freed as much as possible from mineral matter or boracic acid. A rod $e$ is attached to this electrode, which must not be a conductor of electricity or else must be provided with an insulating section, by which the electrode E may be moved forward and back by means of a hydraulic or pneumatic cylinder C and a piston, the valves of which are controlled by the hand lever L. E' is a similar carbon electrode fixed in the bottom of the furnace, and the two electrodes when brought together stop the tap hole $O^4$ of the combustion chamber, and when the movable electrode E is withdrawn it forms with the other electrode E' and the side walls between which it moves the rectangular tap hole $O^4$ which may be opened and closed by the hand lever L controlling the valves aforesaid.

D is a dynamo which may deliver a current of 1500 amperes and 70 volts to the electrodes E E'.

$A^3$ is the lower chamber of the furnace and may contain a car for receiving the liquid carbid, or this chamber may be made relatively deep so as to permit the carbid to drop in globules, cooling a little as they fall so as not to form a solid mass. The outer walls W of the furnace may be made of ordinary brick and of sufficient thickness to admit of continuous operation without much loss of heat.

Above the sloping bottom S and in line with its upper surface, poke holes O' at various intervals may be made through which the pulverulent material may be manipulated by a bar, and at or near these points in the outer wall a door may be constructed for access to this chamber. Other doors may be fitted in the uppermost chamber containing the tubular boilers. The lower chamber may be closed by iron doors. Access to the combustion chamber may also be had from the lower chamber by removing the carbon electrodes E E' and the adjacent blocks which for this purpose may be made removable.

Within the tube T is arranged an oil spray M which may be used to start the furnace, the oil being sprayed in, drawing in with it air as a supporter of combustion through the tube T. And I may continue the use of liquid fuel throughout the process, using the pulverizer P for delivering only the pulverulent coke and lime, the raw materials from which the calcium carbid is made. Or I may spray or otherwise moisten the pulverulent coke and lime with liquid fuel. And still other arrangements may be made comprising one, two, or more pulverizers, whereby the combustible material intended to liberate enegy in the form of heat may, while burning and moving in air, be brought into close contact with the pulverulent material from which the calcium carbid is made.

The operation of my furnace has been set forth in describing the furnace itself and my process, but I will describe its operations more particularly when liquid fuel is used and calcium carbid is made. The tap hole $O^4$ is closed by a movement of the hand lever L which operates the hydraulic piston within the cylinder C, the stem $e$ of the movable electrode, and the movable electrode itself so as to bring the two electrodes E and E' into contact. The pulverizer P is charged with coke 35 parts and lime 65 parts, and the pulverizer set in operation with the damper in the tube T' open and the damper in the flue Y closed. Pulverulent material in proper proportion for forming calcium carbid is thus charged into the chamber A', and is mixed on the baffle plates $p$ down which it slides on to the inclined bottom S, which it covers with a quantity of pulverulent material some inches thick. Still further pulverulent material is accumulated in the chamber A' which feeds down by gravity as needed, aided if necessary by a bar working through the poke-holes. This pulverulent material is primarily intended for insulation and for the protection of the part of the permanent furnace underneath this bed of material, and yet its composition may oftentimes be the same as that of the material to be treated, the bulk of which material to be treated is injected into the furnace on the current of air and fuel, entering preferably from the top and impinging upon this bed of pulverulent material. Treating as I do, the bulk of the material treated in a pulverulent form, in suspension, instead of in aggregation, it is obvious that when this body of material is of a nature to be fused under the high temperature obtained, it should be made up of the constituents of the material introduced with the blast, or some of them, or of one of them, but on the other hand, where this body of material is such as will not fuse and will not burn, it may be formed of such material as does not enter into the chemical reaction.

Concurrently with charging the chamber A' and covering the sloping bottom S of the combustion chamber A with combustible material, or following this charging process, I spray in through M liquid fuel or other liquid combustible borne on or otherwise commingled with a current of air, or other supporter of combustion, in proportion for perfect combustion, and continue this until the combustion chamber is brought to a very high temperature; whereupon I close the damper $d$ in the tube T', open the damper in the flue Y and keep the pulverizer P going, furnishing to the combustion chamber a continuous charge of pulverulent coke and lime, borne on the same current of air, or oxygen, or supporter of combustion, or otherwise commingled with it, in the same volume, as when the fuel oil alone was borne, and thus bring each molecule of oxygen into contact with the fuel and the pulverulent constituents of calcium carbid into intimate contact particle by particle with the burning fuel oil, thus using radiant heat at shortest range. Ignition of the fuel oil takes place immediately upon entering the combustion chamber at the top, and passing downward the commingled flame and constituent materials reach the point of most energetic combustion and of fiercest heat just below the widest part of the furnace and where the sloping bottom is protected, at which point the most refractory fire brick would be easily fused, and at which the pulverulent lime preheated on the way down is ready to fuse. A little lower down, this current of commingled flame and pulverulent material impinges with blow-pipe effect and greater heat on the body of pulverulent lime and coke in the bottom of the furnace and fuses the pulverulent lime therein, and in the blast, chemically uniting therewith the solid highly heated particles of carbon. The current of hot gases now doubles back and passes upward with sufficient heat to melt all the pulverulent lime that is fine enough to be upborne, uniting therewith in mid air all the finer pulverulent coke commingled therewith that is fine enough to be upborne, the fused particles agglomerating into larger masses and falling, while this upward current of hot gases also reinforces the heat of the incoming fuel oil, preheating the incoming commingled coke and lime, the outgoing hot gases enveloping the incoming materials.

Instead of the restricted region within a few inches of the electric arc in which only, in the electric furnace, calcium carbid is formed, I provide an unclogged and much larger theater of action for the play of these chemical forces, consuming all the liquid fuel, or soft coal, as the case may be, in perfect combustion, with minimum nitrogen, using the heat at shortest range, fusing all the pulverulent lime and uniting therewith all the pulverulent coke commingled therewith, without obstruction by ash. I thus avoid all waste of heat by useless radiation or conduction and all waste of material from floating dust borne away from the combustion chamber except the ash, which does not chemically unite with the fused lime, and ought to be borne away. When, now, a body of fused lime is forming, a temperature sufficiently high is reached for the formation of calcium carbid throughout the bath, as well as, for the finest material, throughout the combustion chamber; for in this as in other chemical compounds, but one of the constituents need be fused, while the other, raised to the same temperature, may remain in the solid state until the chemical union takes place, the carbon then displacing the oxygen of the lime, though at lower temperatures the strongest affinity of carbon is for oxygen.

The well-known reaction is:—

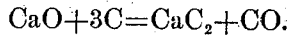
$$CaO + 3C = CaC_2 + CO.$$

For lime, carbonate of lime may be substituted according to the following formula:

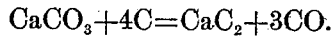
$$CaCO_3 + 4C = CaC_2 + 3CO.$$

The small quantity of carbon monoxid formed when lime is used, the larger quantity when carbonate of lime is used, also burns in the region of the chemical action by which carbid is formed, thus contributing its quota of heat to the process.

Having now accumulated a sufficient run of calcium carbid to reach the level of the slag hole, a supplementary surface blast containing like the principal blast a combustible and a supporter of combustion in the proportion for complete combustion, with or without the constituents of calcium carbid borne therein, or the hot products of combustion or any other hot blast may be directed obliquely on the surface of the carbid toward the slag hole, which on being opened enables me to clear off the surface the lighter slags. This done, the tap hole in the bottom of the furnace, the two opposite sides of which are formed of the electrodes E and E' is opened by moving back one of the electrodes, and the run is discharged into a pit or into a car therein. After this is allowed to cool, it may be removed, without loss of the larger part of the heat therein contained. When the tap hole begins to clog, or when the carbid fails to run sufficiently, the current from the dynamo D may be turned on to clear the tap hole. As soon as the run is discharged, I close the tap-hole, cover the sloping bottom with pulverulent material, and continue the injection of fuel, air and the constituent materials.

It is thus seen that there is little loss of the materials by volatilization, and that there is no waste from the production of carbon monoxid, that the charge at the edges of the mass of liquid calcium carbid is partially consolidated and does not run out, and as the carbid is not removed in the block it does not require to be chipped off, nor does any of the carbid become partially burned, for there is no heat employed in the formation of the carbid higher than that necessary for the chemical reaction, and there is no clogging of the outlet.

Neither in my process nor in my apparatus do I confine myself to the details or to the uses herein particularly set forth, but both admit of variations of considerable extent without departing from the spirit of my invention. For example, I need not mix the constituent materials of the carbid but may introduce pulverulent lime with the air and the combustible employed for generating heat, and introduce the finely divided or pulverulent coke, or in place thereof coal or its equivalent, in bulk from the second chamber A', allowing it to slide down the inclined sides of the combustion chamber, absorb heat, and encounter the lime fused in the bottom of the combustion chamber, in which the carbon thus submerged and raised to the same high temperature as the lime, is chemically united with the lime. Or I may reverse this and introduce the pulverulent coke, or in place thereof coal, or other form of carbon, with the air and combustible through the tube T and introduce the pulverulent or finely divided lime in bulk from the second chamber A', allowing it to slide down the inclined sides of the combustion chamber A, absorb heat, be fused, then chemically unite with the highly heated coke. Or I may inject the material upward from the bottom of the furnace. Or I may construct a furnace with the combustion chamber upside down, injecting the finely divided or pulverulent constituents commingled or separate as last above recited, from the bottom, upwardly, making the combustion chamber of sufficient height to provide a region of most intense combustion before the material strikes the top of the furnace. Or I may make the furnace of less height and construct the top thereof of blocks of one or of all the constituent materials of calcium carbid, allowing the blast to impinge upon these blocks and wear them away, converting their substance into the product of the furnace, substituting other blocks for the worn away blocks. Again, I may introduce the pulverulent constituents of the carbid or other igneous compound to be made in the furnace or the ore to be reduced, into the second chamber A' in bulk, or by a worm feed, or by hand stoking or otherwise. I find that fine or uniform grinding is not necessary in making the run carbid produced in my furnace, but that larger sizes are admissible, and all admissible sizes may be commingled, making the furnace higher, the coarser the material. Furthermore, I do not adhere closely to the proportions of coke and lime in making carbid and sometimes employ a slight excess of lime to act as a flux, causing fusion at a slightly lower temperature, or I may inject an excess of coke in order to provide for the combustion of some portion thereof forming $CO$ and then $CO_2$, leaving a scant proportion of coke for the making of the carbid, except for this original excess of coke, or I may use coal in place of coke, as well as for combustion-burning a part and combining the remainder with the lime.

I may increase the proportion of oxygen in the air or employ pure oxygen, or any mixture thereof as a supporter of combustion,—or any other supporter of combustion appropriate to the material treated.

Referring now to the broad features of my invention, my improved process and furnace may be employed also in the reduction of ores and the recovery of the metal therein; and in the preliminary treatment of ores; and my furnace has a wide range of uses, outside of those enumerated, fulfilling the uses, with some modifications, of the hearth, the forge and the furnace in the widest acceptation of the term, including shaft furnaces, reverberatory furnaces, closed vessel furnaces, electric furnaces and all those in which the charge and the fuel are in intimate contact; and by maintaining a supply of pulverulent material on the sloping sides of the combustion chamber or otherwise closing the openings from chamber A' into the combustion chamber A, and introducing the material to be treated through the side door W into the combustion chamber A, I may perform therein operations like the treatment of iron in the cupola or the operation of puddling iron and many other like operations, but I do not profess to put on record all the possible uses, nor even to point out the most important.

What I claim and desire to secure by Letters Patent is:—

1. The igneous process which consists in injecting into the combustion chamber material to be treated in pulverulent form commingled with combustible material, and with a supporter of combustion, in a blast impinging upon material to be treated, substantially as described.

2. The igneous process of treating materials which consists in subjecting them to the blow-pipe action of a blast, which blast is made up of a supporter of combustion, fuel and material treated, against another body of material treated, substantially as described.

3. The igneous process of treating materials by injecting them into a combustion chamber, and injecting combustible material and also a supporter of combustion in due proportion for the perfect combustion of the material to be burned, in blasts or a blast impinging upon material of low thermal conductivity, substantially as described.

4. The igneous process of treating finely divided material by bringing the finely divided fuel into intimate contact with sufficient oxygen for the combustion of a portion of said fuel and for heating the unburned portion to the temperature of chemical reaction, and bringing each fine particle of the material acted on into intimate contact with the burning elements, in the region of most intense heat, and using radiant heat at the shortest range, then causing the material in suspension, still in the region of most intense heat to impinge with blow-pipe action upon a bed of finely divided material, substantially as described.

5. The igneous process of treating material in a combustion chamber which consists in upholding the fuel in the supporter of combustion, in bringing the material treated into intimate contact with the burning elements in the region of most intense heat, in using radiant heat at the shortest range, in thermally insulating the material acted on by material to be acted on, in preheating the incoming material with the outgoing hot gases and burning material, in keeping the region of chemical action clear from excess of material, in employing blow-pipe action, in reducing the nitrogen vehicle to a minimum, substantially as described.

6. The igneous process which consists in upholding the fuel in the supporter of combustion, thereby avoiding the internal resistance from ash and clinker in the fire, in thermally insulating the material treated by material to be acted on, in avoiding loss of heat by radiation or conduction, in reducing the nitrogen vehicle to the minimum and in employing blow-pipe action, substantially, as described.

7. The process of treating materials which consists in injecting them into a combustion chamber in pulverulent or finely divided form commingled with combustible material and a supporter of combustion in a flame acting with blow-pipe effect, thereby causing fusion, substantially as described.

8. The igneous process of treating materials which consists in providing a body of material in pulverulent or less finely divided form on the bottom of the furnace and directing thereon a current of air bearing the combustible material and material to be treated in pulverulent or finely divided form, substantially as described.

9. The igneous process of treating material in a combustion chamber which consists in bringing the material acted on into intimate contact with the burning element in the region of most intense heat, then employing blow-pipe action, preheating the incoming material with the outgoing hot gases and burning material, substantially as described.

10. The igneous process of treating materials in which a blast of fuel in a supporter of combustion, preheated by the outgoing products of combustion, is directed on the material to be treated by blow-pipe action, at the region of most energetic combustion, substantially as described.

11. The igneous process of treating materials which consists in injecting them into a combustion chamber in pulverulent or finely divided form, commingled with combustible material and a supporter of combustion in a flame acting with blow-pipe effect, thereby causing fusion, withdrawing the fused material through the tap hole the sides of which comprise electrodes and keeping the tap hole clear by springing an electric arc from side to side thereof, substantially as described.

12. In a furnace for the igneous treatment of materials, a combustion chamber, means for vertically injecting therein a blast of fuel and a supporter of combustion commingled with the material treated in pulverulent or finely divided form, and means for causing the said blast to impinge upon a bed of material.

13. In a furnace for the igneous treatment of material, means by which the material to be treated is injected into the combustion chamber in a pulverulent or finely divided form, commingled with fuel and a supporter of combustion, means by which a region of most energetic combustion is established at or near the opposite end of the furnace, and means for causing the flame to impinge thereon with blow-pipe effect.

14. A furnace for the igneous treatment of materials having the sloping sides thereof thermally insulated by a lining composed of a loose body of one or more refractory materials.

15. A furnace for the igneous treatment of material by fusion, having a tap hole, the sides of which comprise electrodes carrying an electric current adapted to clear the tap hole.

16. In a furnace for the igneous treatment of material, the combination of a pulverizer, and a combustion chamber, and a delivery tube connecting the two, an adjustable sleeve at the delivery end of the tube, and means for adjusting and moving the sleeve, so as to get blow-pipe action against various parts of the opposite end of the furnace.

17. In a furnace, a combustion chamber, means for injecting a blast of fuel and a supporter of combustion therein vertically downward, and means for projecting the blast upon a bed of materials.

In witness whereof, I have hereunto set my hand at the city, county and State of New York, this 3rd day of October, 1905.

JOHN S. SEYMOUR.

In presence of—
  ISABEL RICHARDS,
  H. J. LILLIE.